US012451108B2

(12) United States Patent
Maezawa

(10) Patent No.: US 12,451,108 B2
(45) Date of Patent: Oct. 21, 2025

(54) MUSICAL PERFORMANCE CORRECTION METHOD AND MUSICAL PERFORMANCE CORRECTION DEVICE

(71) Applicant: YAMAHA CORPORATION, Hamamatsu (JP)

(72) Inventor: Akira Maezawa, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 851 days.

(21) Appl. No.: 17/355,574

(22) Filed: Jun. 23, 2021

(65) Prior Publication Data

US 2021/0319775 A1 Oct. 14, 2021

Related U.S. Application Data

(63) Continuation of application No. PCT/JP2019/049914, filed on Dec. 19, 2019.

(30) Foreign Application Priority Data

Dec. 28, 2018 (JP) ................................ 2018-248198

(51) Int. Cl.
*G10H 1/053* (2006.01)
*G10H 1/00* (2006.01)

(52) U.S. Cl.
CPC ........... *G10H 1/053* (2013.01); *G10H 1/0008* (2013.01); *G10H 1/0066* (2013.01); (Continued)

(58) Field of Classification Search
CPC .... G10H 1/053; G10H 1/0008; G10H 1/0066; G10H 2210/066; G10H 2210/091; G10H 2210/335
See application file for complete search history.

(56) References Cited

U.S. PATENT DOCUMENTS

2004/0112203 A1 6/2004 Ueki
2011/0004467 A1* 1/2011 Taub .................. G11B 27/034 381/62

(Continued)

FOREIGN PATENT DOCUMENTS

CN 103021389 A 4/2013
CN 105957515 A 9/2016

(Continued)

OTHER PUBLICATIONS

Office Action issued in Chinese Appln. No. 201980086269.7 mailed Jun. 14, 2023. English translation provided.

(Continued)

*Primary Examiner* — Jianchun Qin
(74) *Attorney, Agent, or Firm* — ROSSI, KIMMS & McDOWELL LLP

(57) ABSTRACT

A musical performance correction method executable by a computer, the musical performance correction method includes: estimating a playing position in a musical composition by analyzing musical performance data indicating a played pitch played by a user; and correcting the played pitch indicated by the musical performance data to a reference pitch, from among a plurality of reference pitches corresponding to the playing position in the musical composition, in a case where a difference between the played pitch and the reference pitch is less than a predetermined value.

17 Claims, 7 Drawing Sheets

(52) U.S. Cl.
CPC . *G10H 2210/066* (2013.01); *G10H 2210/091* (2013.01); *G10H 2210/335* (2013.01)

(56) References Cited

U.S. PATENT DOCUMENTS

| | | | |
|---|---|---|---|
| 2013/0074679 | A1 | 3/2013 | Minamitaka |
| 2016/0260425 | A1 | 9/2016 | Saino et al. |

FOREIGN PATENT DOCUMENTS

| | | | | |
|---|---|---|---|---|
| CN | 108231048 | A | | 6/2018 |
| JP | H0744184 | A | | 2/1995 |
| JP | 2000187485 | A | | 7/2000 |
| JP | 2004206073 | A | | 7/2004 |
| JP | 2007241181 | A | | 9/2007 |
| JP | 2009128772 | A | | 6/2009 |
| JP | 2014191331 | A | | 10/2014 |
| JP | 2015001587 | A | * | 1/2015 |
| JP | 2015034923 | A | | 2/2015 |
| JP | 2015079183 | A | | 4/2015 |

OTHER PUBLICATIONS

International Search Report issued in Intl. Appln. No. PCT/JP2019/049914 mailed Mar. 10, 2020. English translation provided.

Written Opinion issued in Intl. Appln. No. PCT/JP2019/049914 mailed Mar. 10, 2020.

Office Action issued in Japanese Appln. No. 2018-248198 on Jan. 10, 2023. English machine translation provided.

Office Action issued in Japanese Appln. No. 2018-248198 mailed Aug. 16, 2022. English machine translation provided.

English translation of Written Opinion issued in Intl. Appln. No. PCT/JP2019/049914 mailed Mar. 10, 2020, previously filed Jun. 23, 2021.

International Preliminary Report on Patentability issued in Intl. Appln. No. PCT/JP2019/049914 mailed Jul. 8, 2021. English translation provided.

* cited by examiner

MUSICAL PERFORMANCE CORRECTION METHOD AND MUSICAL PERFORMANCE CORRECTION DEVICE

CROSS REFERENCE TO RELATED APPLICATIONS

The present application is a continuation application of International Application No. PCT/JP2019/049914, filed Dec. 19, 2019, which claims priority to Japanese Patent Application No. 2018-248198, filed Dec. 28, 2018. The contents of these applications are incorporated herein by reference in their entirety.

BACKGROUND

The present disclosure relates to a technique for assisting musical performance performed by a user.

Conventionally, various techniques have been proposed for assisting musical performance performed using electronic instruments such as electronic keyboard instruments. JP 2004-206073A (hereinafter referred as "Patent Literature 1"), for example, discloses a technique for correcting a pitch played by a user on an electronic instrument to a pitch corresponding to a chord in a musical composition. Specifically, the playback position in a musical composition moves forward in units of bars, and a pitch played by a user is corrected to a pitch corresponding to a chord that is specified in regard to the bar (e.g., a pitch of a note constituting the chord).

SUMMARY

However, with the technique in Patent Literature 1, there is a possibility that a pitch played by the user cannot be corrected to an appropriate pitch if the player's playing position is separated from the playback position in the musical composition. Furthermore, since a musical composition can include pitches other than those of chord notes, there also is a possibility that a pitch played by the user cannot be corrected to an appropriate pitch with the technique in Patent Literature 1 of performing correction to a chord note. In consideration of the above-described circumstances, the present disclosure aims to appropriately correct a pitch played by a user.

In order to solve the above-described problems, a musical performance correction method pertaining to one aspect of the present disclosure includes: estimating a playing position in a musical composition by analyzing musical performance data indicating a played pitch played by a user; and correcting the played pitch indicated by the musical performance data to a reference pitch the difference of which from the played pitch is less than a predetermined value, from among a plurality of reference pitches corresponding to the playing position in the musical composition.

A musical performance correction device pertaining to one aspect of the present disclosure includes: a musical performance analysis unit that estimates a playing position in a musical composition by analyzing musical performance data indicating a played pitch played by a user; and a pitch correction unit that corrects the played pitch indicated by the musical performance data to a reference pitch the difference of which from the played pitch is less than a predetermined value, from among a plurality of reference pitches corresponding to the playing position in the musical composition.

DETAILED DESCRIPTION

First Embodiment

Figure 1:
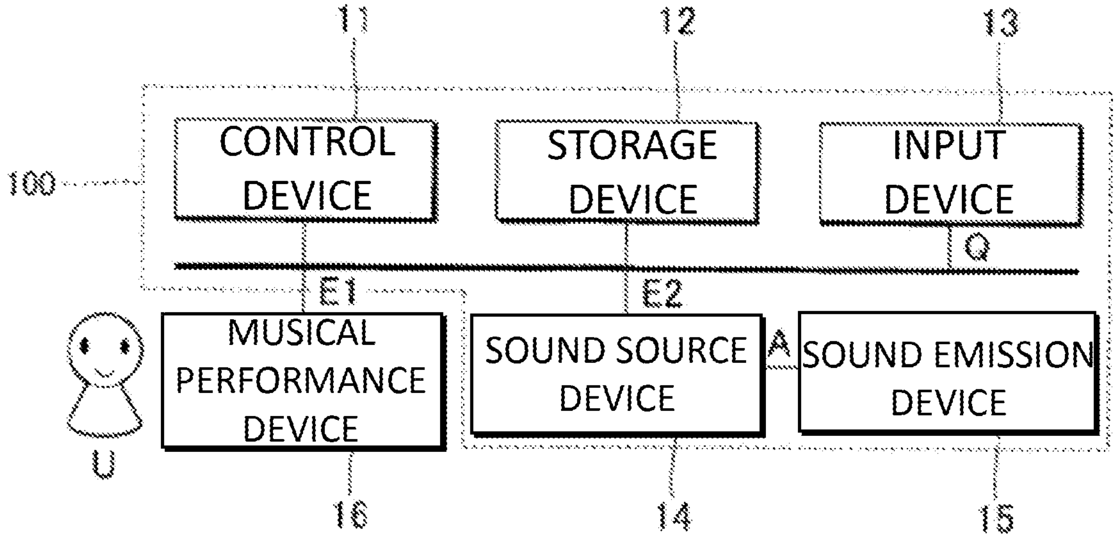
FIG. 1 is a block diagram illustrating an example of a configuration of a musical performance correction device pertaining to a first embodiment.

FIG. 1 is a block diagram illustrating an example of a configuration of a musical performance correction device 100 pertaining to a first embodiment of the present disclosure. The musical performance correction device 100 is a musical performance assisting system that corrects musical performance of musical compositions performed by a user U. The musical performance correction device 100 is realized by a computer system including a control device 11, a storage device 12, an input device 13, a sound source device 14, and a sound emission device 15. The musical performance correction device 100 is an information terminal such as a portable telephone, a smartphone, or a personal computer, for example.

A musical performance device 16 is connected to the musical performance correction device 100 in the first embodiment. The musical performance device 16 is an input device that the user U uses to play musical compositions. The musical performance device 16 is a keyboard instrument-type electronic instrument in which a plurality of keys that the user U operates are arranged in a line, for example. For example, the musical performance device 16 is a Musical Instrument Digital Interface (MIDI) instrument. The musical performance device 16 supplies the musical performance correction device 100 with musical performance data E1 indicating musical performance of a musical composition performed by the user U. Note that the musical performance correction device 100 and the musical performance device 16 may be integrated. Furthermore, the method of connection between the musical performance correction device 100 and the musical performance device 16 may be wired or wireless connection.

Figure 2:
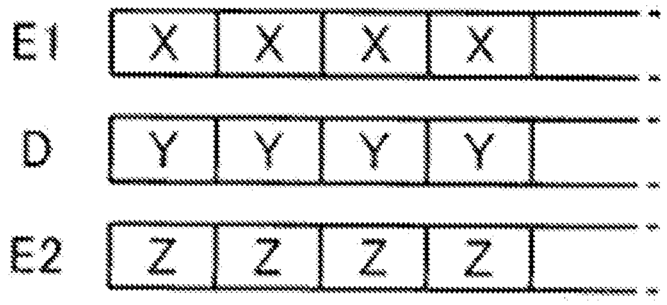
FIG. 2 is a diagram describing musical performance data and musical composition data.

FIG. 2 is a diagram describing the musical performance data E1, musical performance data E2, and musical composition data D. The musical performance data E1 is data indicating a time sequence of pitches (hereinafter "played pitches") X played by the user U using the musical performance device 16. The musical performance data E1 is MIDI data specifying a played pitch X and a played velocity for each note, for example. The musical performance data E2 is data indicating a time sequence of pitches (hereinafter "corrected pitches") Z obtained by correcting the played pitches X indicated by the musical performance data E1. The musical performance data E2 is MIDI data specifying a corrected pitch Z and a played velocity for each note, for example. The musical composition data D specifies a time sequence of pitches (hereinafter "reference pitches") Y of notes constituting the musical composition. In other words, the musical composition data D is musical score data indicating a musical score stipulating the content of the musical performance performed by the user U. The musical composition data D is MIDI data specifying a reference pitch Y and a played velocity for each note, for example.

The control device 11 in FIG. 1 is configured using one or more processing circuits such as central processing units (CPUs) for example, and controls the elements of the musical performance correction device 100. The control device 11 in the first embodiment generates the musical performance data E2 by correcting the musical performance data E1 received from the musical performance device 16.

The storage device 12 is constituted by one or more memories that are each configured using a known recording medium such as a magnetic recording medium or a semiconductor recording medium, for example. The storage device 12 stores one or more programs to be executed by the control device 11 and various types of data to be used by the control device 11. Note that the storage device 12 may be configured as a combination of a plurality of types of recording media. Furthermore, the storage device 12 may be configured as a portable recording medium that can be attached to and detached from the musical performance correction device 100 or an external recording medium (e.g., an online storage) with which the musical performance correction device 100 can communicate via a communication network. The storage device 12 stores the musical composition data D of the musical composition played by the user U.

The input device 13 accepts instructions from the user U. For example, the input device 13 consists of a plurality of operation elements operated by the user U or a touch panel that senses contact made thereto by the user U. Furthermore, the input device 13 may be a sound collection device that is capable of receiving voice input. By operating the input device 13 as appropriate, the user U can provide an instruction of a numerical value (hereinafter "adjustment value") Q indicating the level of correction to be applied to played pitches X. That is, the adjustment value Q is a variable value that corresponds to an instruction from the user U.

The sound source device 14 generates a sound signal A corresponding to the musical performance data E2 generated by the control device 11. The sound signal A is a temporal signal indicating an acoustic waveform corresponding to the time sequence of the corrected pitches Z specified by the musical performance data E2. Note that the sound source device 14 may be realized by a software sound source that is realized by the control device 11 executing a program. The sound emission device 15 reproduces the sound indicated by the sound signal A generated by the sound source device 14. For example, the sound emission device 15 is a speaker or a headphone. Note that the musical performance correction device 100 may include a DA converter that performs digital-to-analog conversion on the sound signal A generated by the sound source device 14, and an amplifier that amplifies the sound signal A. Furthermore, the sound source device 14 and the sound emission device 15 may be installed outside the musical performance correction device 100 as separate devices. For example, the sound source device 14 and the sound emission device 15 may be connected to the musical performance correction device 100 via wired or wireless connection.

Figure 3:
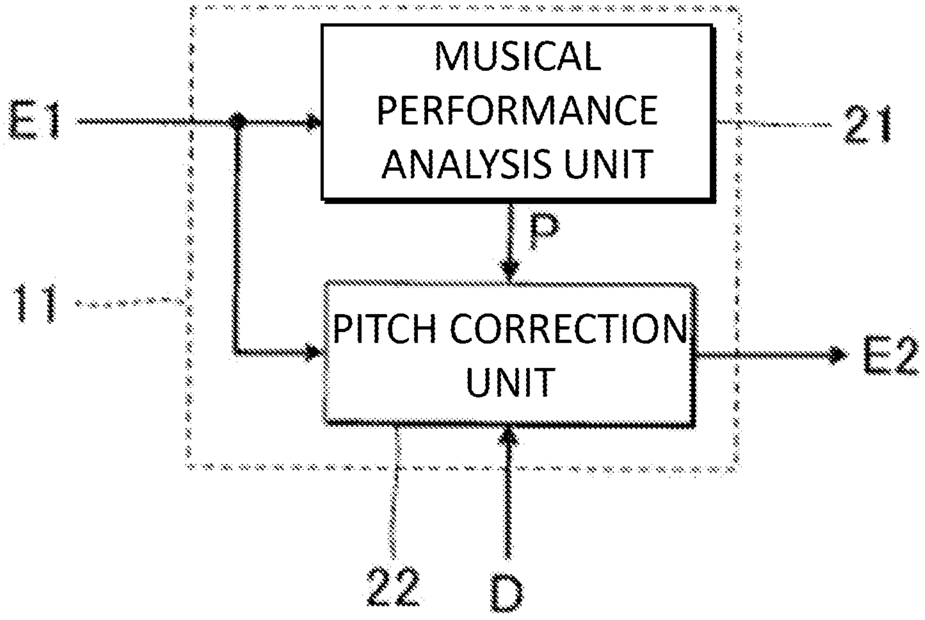
FIG. 3 is a block diagram illustrating an example of a functional configuration of the musical performance correction device.

FIG. 3 is a block diagram describing the functions of the musical performance correction device 100. The functions of the musical performance correction device 100 are realized by the control device 11 executing one or more programs stored in the storage device 12. The musical performance correction device 100 includes a musical performance analysis unit 21 and a pitch correction unit 22. Note that the control device 11 may be realized by a plurality of devices that are formed separately from one another. A part or all of the functions of the musical performance correction device 100 may be realized by one or more dedicated electronic circuits.

<Musical Performance Analysis Unit 21>

The musical performance analysis unit 21 estimates a playing position P in the musical composition by analyzing the musical performance data E1. The playing position P is the time point in the musical composition that is being currently played by the user U. The estimation of the playing position P is repeated concurrently as the user U plays the musical composition. Accordingly, the playing position P estimated by the musical performance analysis unit 21 moves toward the end of the musical composition as time passes.

The musical performance analysis unit 21 calculates a likelihood L(s) for each of a plurality of time points s on the time axis in the musical composition. The likelihood L(s) at a given time point s is an index of the probability that the user U is playing the time point s in the musical composition. Under the condition that playing positions P are temporally consecutive, the musical performance analysis unit 21 estimates a time point s with a high likelihood L(s) as the playing position P. The technique disclosed in JP 2015-79183A, for example, is used for the estimation of the playing position P.

The likelihood L(s) can be expressed by formula (1) below, for example.

$$L(s)=\Sigma_{n,n'}\{y(s,n')p(n',n)x(n)\} \quad (1)$$

The symbols n and n' in formula (1) each indicate one of the N pitches that can be played using the musical performance device 16. The variable y(s,n') in formula (1) is set to the numerical value 1 if the pitch n' is played at the time point s in the musical composition indicated by the musical composition data D, and is set to the numerical value 0 if the pitch n' is not played at the time point s. That is, the series of N variables y(s,1) to y(s,N) corresponding to pitches differing from one another is an N dimensional vector indicating the content of musical performance specified by the musical composition data D in regard to the time point s.

The variable x(n) in formula (1) is set to the numerical value 1 if the user U is currently playing the pitch n, and is set to the numerical value 0 if the user U is not playing the pitch n. That is, the series of N variables x(1) to x(N) corresponding to pitches differing from one another is an N dimensional vector indicating the content of musical performance (in specific, the key pressing state) by the user U at the current time point.

The variable p(n',n) in formula (1) indicates the probability of the user U erroneously playing the pitch n (example of second pitch) at a position in the musical composition where the pitch n' (example of first pitch) should actually be played. The probability p(n',n) is set by performing statistical processing on the results of musical performance performed by a plurality of players for each of a plurality of combinations of two pitches n' and n arbitrarily selected from the N pitches. The higher the frequency of the pitch n actually played at a position in the musical composition where the pitch n' should be played, the higher the probability p(n',n) tends to be.

The greater the similarity between the series of N variables y(s,1) to y(s,N) corresponding to the musical composition data D and the series of N variables x(1) to x(N) indicating the actual musical performance performed by the user U, the greater the numerical value of the likelihood L(s) in formula (1). Furthermore, the musical performance analysis unit 21 takes the probability p(n',n) of the pitch n being played in place of the pitch n' into consideration in the calculation of the likelihood L(s). Accordingly, the musical performance analysis unit 21 can estimate the playing position P with high accuracy even if the user U makes a mistake during the musical performance.

<Pitch Correction Unit 22>

Figure 4:
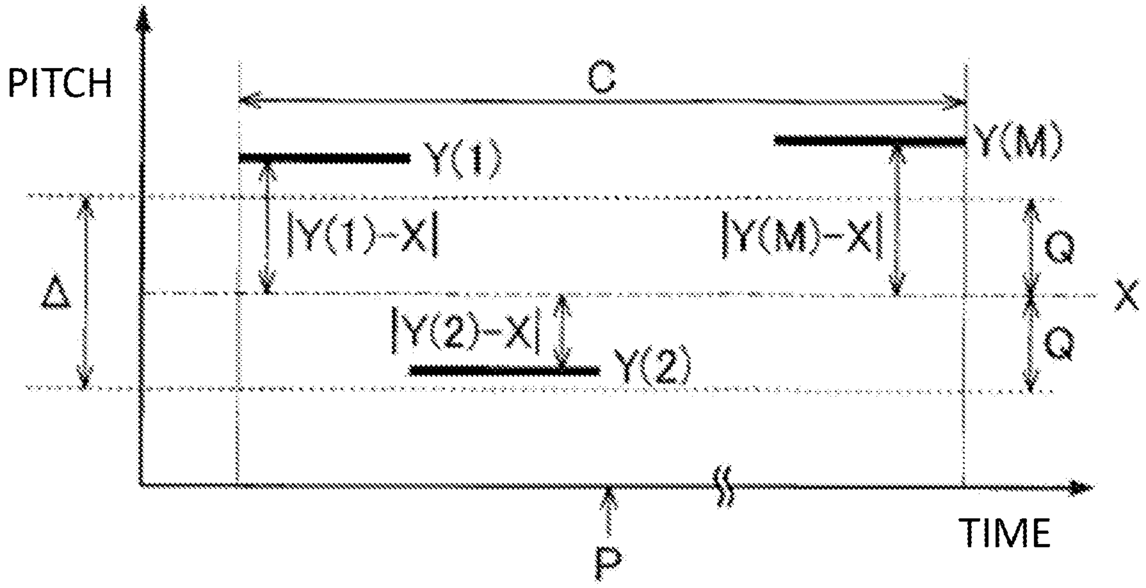
FIG. 4 is a diagram describing pitch correction processing.

The pitch correction unit 22 corrects the played pitches X indicated by the musical performance data E1. FIG. 4 is a diagram describing an operation (hereinafter "pitch correction processing") in which the pitch correction unit 22 corrects a played pitch X. A candidate period C is a period of a predetermined length that includes the playing position P estimated by the musical performance analysis unit 21. For example, the candidate period C is a period centering on the playing position P that has a time length corresponding to a quarter note. M reference pitches Y(1) to Y(M) (where M is a natural number) specified by the musical composition data D are present within the candidate period C. The number M of the reference pitches Y(m) (where m is 1 to M) within the candidate period C fluctuates depending on the playing position P and the content of the musical composition indicated by the musical composition data D.

Figure 5:
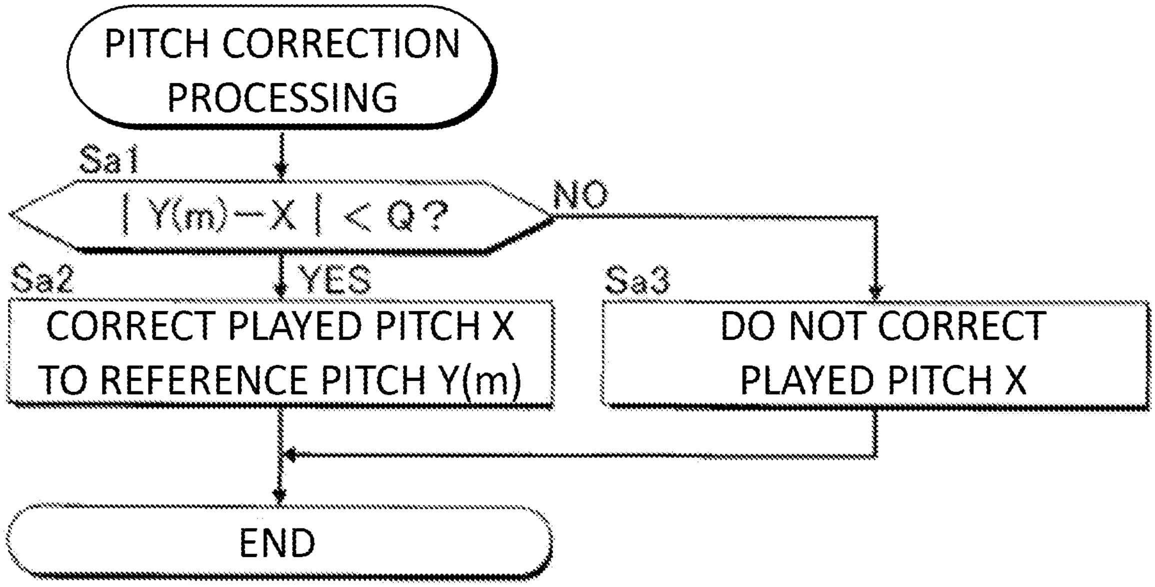
FIG. 5 is a flowchart illustrating an example of a specific procedure of the pitch correction processing pertaining to the first embodiment.

FIG. 5 is a flowchart illustrating an example of a specific procedure of the pitch correction processing. The pitch correction processing is executed concurrently as the user U plays the musical performance device 16. The pitch correction processing is executed sequentially for each played pitch X.

When the pitch correction processing is started, the pitch correction unit 22 calculates pitch differences. The pitch differences are the differences $|Y(m)-X|$ between the reference pitches Y(m) and the played pitch X. The pitch correction unit 22 determines whether or not there is a reference pitch Y(m) having a pitch difference less than the adjustment value Q, among the M reference pitches Y(1) to Y(M) within the candidate period C (Sa1).

If there is a reference pitch Y(m) having a pitch difference less than the adjustment value Q within the candidate period C (Sa1: YES), the pitch correction unit 22 corrects the played pitch X to the reference pitch Y(m) (Sa2). That is, as illustrated for example in FIG. 4, the played pitch X is corrected to a reference pitch Y(2) that is present within a range Δ extending over a width 2Q in the pitch axis direction with the played pitch X at the center thereof. The pitch correction unit 22 outputs, to the sound source device 14, musical performance data E2 in which the reference pitch Y(m) is set as the corrected pitch Z in place of the played pitch X. Note that, if a plurality of reference pitches Y(m) have a pitch difference less than the adjustment value Q, the pitch correction unit 22 sets the reference pitch Y(m) having the smallest pitch difference as the corrected pitch Z.

On the other hand, if there is no reference pitch Y(m) having a pitch difference less than the adjustment value Q within the candidate period C (Sa1: NO), the pitch correction unit 22 does not correct the played pitch X (Sa3). That is, the played pitch X is not corrected if all of the M reference pitches Y(1) to Y(M) within the candidate period C are outside the range Δ. The pitch correction unit 22 outputs, to the sound source device 14, musical performance data E2 in which the played pitch X is set as the corrected pitch Z.

The greater the adjustment value Q corresponding to the instruction from the user U (that is, the wider the range Δ), the more likely played pitches X are corrected to reference pitches Y(m). That is, the adjustment value Q is a coefficient for setting the level of correction (e.g., frequency of correction) to be applied to played pitches X. According to the above-described configuration, the level of correction to be applied to played pitches X can be adjusted in accordance with the proficiency with which the user U can play music, for example. For example, if the user U is still not used to playing music, a state in which played pitches X are readily corrected can be set by setting the adjustment value Q to a large numerical value. On the other hand, if the user U has become proficient at playing music, a state in which played pitches X are not readily corrected can be set by setting the adjustment value Q to a small numerical value.

Figure 6:
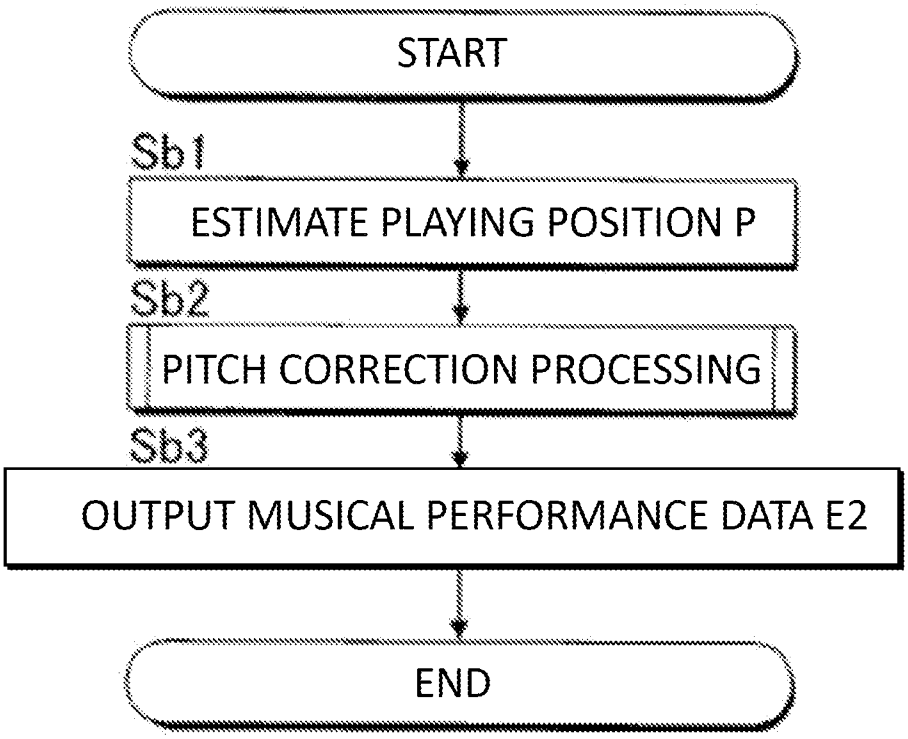
FIG. 6 is a flowchart illustrating an example of a specific procedure of operations of the musical performance correction device.

FIG. 6 is a flowchart illustrating an example of a specific procedure of operations executed by the musical performance correction device 100. The musical performance analysis unit 21 estimates the playing position P in the musical composition by analyzing the musical performance data E1 received from the musical performance device 16 (Sb1). Through the pitch correction processing, an example of which is illustrated in FIG. 5, the pitch correction unit 22 corrects the played pitch X played by the user U to a reference pitch Y(m) the pitch difference of which from the played pitch X is less than the adjustment value Q, from among the M reference pitches Y(1) to Y(M) corresponding to the playing position P (Sb2). As already described above, if there is no reference pitch Y(m) having a pitch difference less than the adjustment value Q within the candidate period C, the pitch correction unit 22 does not correct the played pitch X. The pitch correction unit 22 outputs, to the sound source device 14, musical performance data E2 indicating the corrected pitch Z after the pitch correction processing (Sb3). Accordingly, played sound in which a played pitch X that is close to a reference pitch Y(m) within a candidate period C is corrected to the reference pitch Y(m) and a played pitch X that is separated from reference pitches Y(m) within a candidate period C is kept at the same pitch is output from the sound emission device 15. Note that the processing in FIG. 6 may be repeated at a predetermined cycle.

As described above, a played pitch X played by the user U is corrected to a reference pitch Y(m) the pitch difference of which from the played pitch X is less than the adjustment value Q, from among M reference pitches Y(1) to Y(M) corresponding to the playing position P estimated from the musical performance performed by the user U. Accordingly, the musical performance correction device 100 can correct a played pitch X to an appropriate reference pitch Y(m) that corresponds to the playing position P of the user U in the musical composition and that is close to the played pitch X in the musical composition.

Second Embodiment

A second embodiment of the present disclosure will be described. Note that, in the following examples, reference symbols used in the description of the first embodiment will be applied to elements having functions similar to those in the first embodiment, and detailed description of such elements will be omitted as appropriate. In the second embodiment, the details of the pitch correction processing executed by the pitch correction unit 22 differ from those in the first embodiment. The estimation of the playing position P by the musical performance analysis unit 21 is the same as that in the first embodiment.

Figure 7:
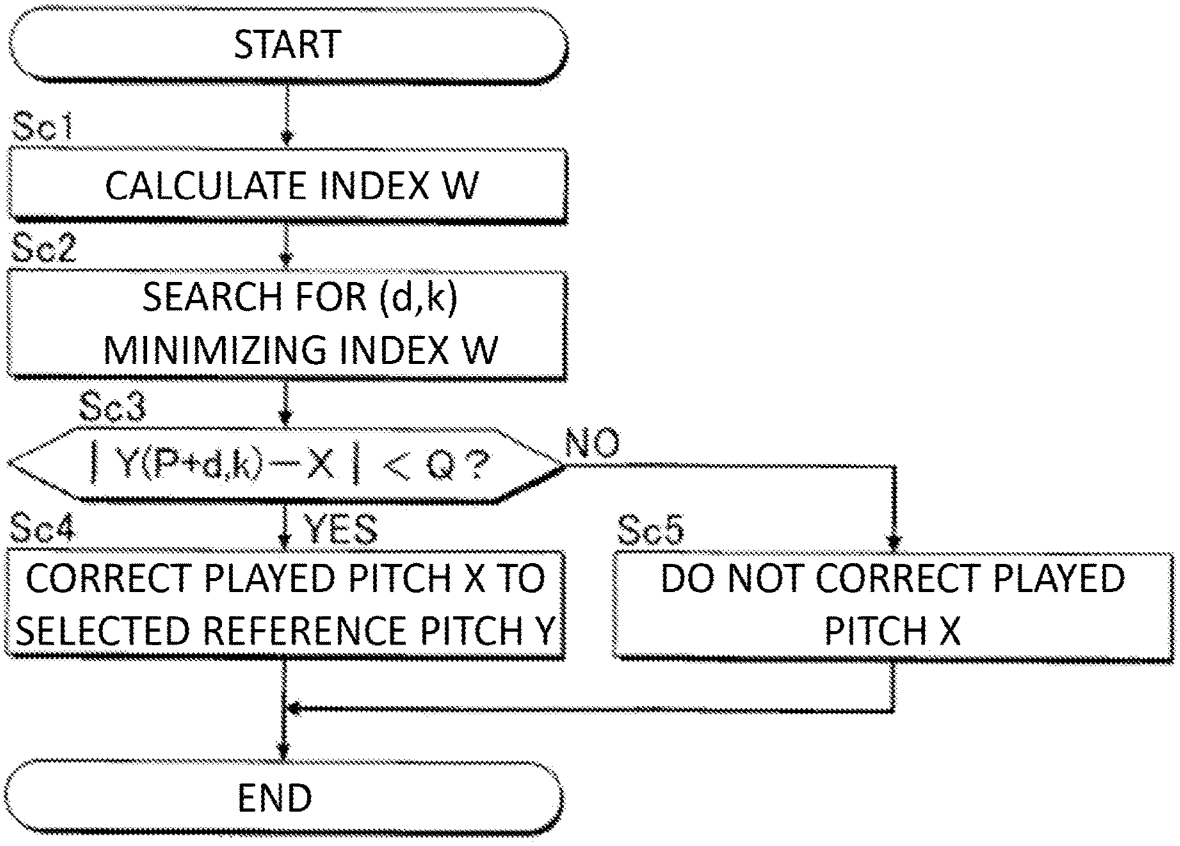
FIG. 7 is a flowchart illustrating an example of a specific procedure of the pitch correction processing pertaining to a second embodiment.

FIG. 7 is a flowchart illustrating an example of a specific procedure of the pitch correction processing in the second embodiment. The pitch correction processing is executed sequentially for each played pitch X. When the pitch correction processing is started, the pitch correction unit 22 calculates an index W expressed by formula (2) below (Sc1).

$$W = \alpha|d| + |Y(P+d, k) - X| \tag{2}$$

The symbol Y(P+d,k) (where k equals 1 to K) in formula (2) indicates one of the K reference pitches Y(P+d,1) to Y(P+d,K) specified by the musical composition data D in regard to a time point (P+d) that is separated from the playing position P by time d. The symbol K is a variable value indicating the number of reference pitches Y that are played concurrently at the time point (P+d) in the musical composition (e.g., the total number of notes constituting a chord). The time d is an arbitrarily defined numerical value (positive number, negative number, or zero). The coefficient α in formula (2) is set to a predetermined positive number (e.g., a positive number that is one or greater).

As can be understood from the first item on the right side of formula (2), the shorter the time d between the reference pitch Y(P+d,k) and the playing position P, the smaller the numerical value of the index W. Furthermore, as can be understood from the second item on the right side of formula (2), the smaller the pitch difference |Y(P+d,k)−X| of the reference pitch Y(P+d,k) from the played pitch X, the smaller the numerical value of the index W. The pitch correction unit 22 searches for a combination of the time d and the variable k that minimizes the above-described index W (Sc2). That is, the pitch correction unit 22 selects one reference pitch (hereinafter “selected reference pitch”) Y(P+d,k) that is close to the playing position P on the time axis (i.e., for which the time d is short) and that is close to the played pitch X. The greater the coefficient α, the greater the influence of the time d on the index W, and thus the less likely a reference pitch Y(P+d,k) for which the time d is long is to be selected. That is, the coefficient α is a weight applied to the time d. Note that a configuration in which the coefficient α is set to zero corresponds to the first embodiment.

The pitch correction unit 22 determines whether or not the pitch difference between the played pitch X and the selected reference pitch Y(P+d,k) is less than the adjustment value Q (Sc3). The pitch difference can be calculated by |Y(P+d,k)−X|. As in the first embodiment, the adjustment value Q is a variable value that corresponds to an instruction from the user U. If the pitch difference is less than the adjustment value Q (Sc3: YES), the pitch correction unit 22 corrects the played pitch X to the selected reference pitch Y(P+d,k) (Sc4). That is, the pitch correction unit 22 outputs, to the sound source device 14, musical performance data E2 in which the selected reference pitch Y(P+d,k) is set as the corrected pitch Z in place of the played pitch X. On the other hand, if the pitch difference is more than the adjustment value Q (Sc3: NO), the pitch correction unit 22 does not correct the played pitch X (Sc5). That is, the pitch correction unit 22 outputs, to the sound source device 14, musical performance data E2 in which the played pitch X is set as the corrected pitch Z.

As can be understood from the description above, in the second embodiment, a played pitch X is corrected to a selected reference pitch Y(P+d,k) that is close to the playing position P on the time axis in the musical composition and the pitch difference of which from the played pitch X is less than the adjustment value Q. That is, the musical performance correction device 100 can correct a played pitch X played by the user U to an appropriate reference pitch Y which is close to the playing position P on the time axis and the pitch difference of which from the played pitch X is small.

<Modifications>

Examples of specific aspects of modification that can be added to the aspects described above as examples will be described below. Two or more aspects selected as desired from the following examples can be combined as appropriate, as long as the aspects to be combined do not mutually contradict.

(1) In the first embodiment, if a plurality of reference pitches Y(m) have pitch differences less than the adjustment value Q, the reference pitch Y(m) having the smallest pitch difference was set as the corrected pitch Z. However, the method for selecting the reference pitch Y(m) to be set as the corrected pitch Z from among a plurality of reference pitches Y(m) is not limited to the above-described example. For example, the reference pitch Y(m) to be set as the corrected pitch Z may be selected from among a plurality of reference pitches Y(m) based on a result obtained by calculating how often playing mistakes occur between two pitches. Specifically, for each combination of two different pitches, an index (hereinafter “playing mistake index”) indicating how often playing mistakes occur between the two pitches is calculated in advance. The pitch correction unit 22 selects, as the corrected pitch Z, one reference pitch Y(m) having the greatest playing mistake index from among a plurality of reference pitches Y(m) having pitch differences less than the adjustment value Q. According to the above-described configuration, a played pitch X pertaining to a combination of pitches between which playing mistakes readily occur can be corrected with priority.

(2) In the above-described embodiments, the correction of played pitches X was performed over the entirety of a musical composition. However, the correction of played pitches X can be exclusively performed for a specific period in a musical composition.

(3) In the above-described embodiments, a keyboard instrument-type musical performance device 16 was described as an example. However, the musical performance device 16 may have any specific form. For example, a wind instrument-type or stringed instrument-type musical performance device 16 may be used.

(4) The musical performance correction device 100 may be realized by a server device that performs communication with an information terminal such as a portable telephone or a smartphone. For example, the musical performance correction device 100 receives musical performance data E1 from an information terminal to which the musical performance device 16 is connected, and generates musical performance data E2 from the musical performance data E1 and transmits the musical performance data E2 to the terminal device.

(5) The musical performance correction device 100 pertaining to each of the above-described embodiments is realized through cooperation between a computer (in specific, the control device 11) and one or more programs, as in the examples described in the embodiments. The one or more programs pertaining to the above-described embodiments can be installed to the computer by being provided in a form in which the programs are stored in a computer-readable recording medium. For example, the recording medium is a non-transitory recording medium, one good example of which is an optical recording medium (optical disc) such as a CD-ROM. However, known recording media of any format can be included, such as semiconductor recording media or magnetic recording media. Note that non-transitory recording media, other than transitory propagating signals, includes recording media of any type, and volatile recording media is not an exception. Furthermore, the programs can be provided to computers through distribution over communication networks.

(6) For example, the following configurations can be understood from the embodiments described above as examples.

A musical performance correction method pertaining to one aspect (first aspect) of the present disclosure includes: estimating a playing position in a musical composition by analyzing musical performance data indicating a played pitch played by a user; and correcting the played pitch indicated by the musical performance data to a reference pitch the difference of which from the played pitch is less than a predetermined value, from among a plurality of reference pitches corresponding to the playing position in the musical composition. According to the above-described aspect, a played pitch played by a user is corrected to a reference pitch the difference of which from the played pitch is less than a predetermined value, from among a plurality of reference pitches corresponding to a playing position estimated from the musical performance. Accordingly, the played pitch can be corrected to an appropriate reference pitch that corresponds to the playing position of the user in the musical composition and that is close to the played pitch in the musical composition.

In an example (second aspect) of the first aspect, in the correction of the played pitch, the played pitch is corrected to a reference pitch the difference of which from the played pitch is less than the predetermined value, from among a plurality of reference pitches within a candidate period including the playing position in the musical composition. According to the above-described aspect, a played pitch played by the user can be corrected to an appropriate reference pitch having a small pitch difference from the played pitch, within a candidate period including the playing position.

In an example (third aspect) of the first aspect, in the correction of the played pitch, the played pitch is corrected to a reference pitch which is close to the playing position on a time axis in the musical composition and of which the difference from the played pitch is less than the predetermined value. According to the above-described aspect, a played pitch played by the user can be corrected to an appropriate reference pitch which is close to the playing position on the time axis and which has a small pitch difference from the played pitch.

In an example (fourth aspect) of any one of the first to third aspects, the predetermined value is a variable value that corresponds to an instruction from the user. According to the above-described aspect, since the predetermined value to be compared with the difference between a reference pitch and a played pitch is a variable value that corresponds to an instruction from the user, the level (e.g., the frequency) of correction to be applied to played pitches can be adjusted in accordance with the proficiency with which the user can play music, for example.

In an example (fifth aspect) of any of the first to fourth aspects, in the estimation of the playing position, the playing position is estimated using the probability, for each of a plurality of combinations of a first pitch and a second pitch, of the second pitch being erroneously played in place of the first pitch. In the above-described aspect, the probability of the second pitch being erroneously played in place of the first pitch is used for the estimation of the playing position, and thus the playing position in the musical composition can be estimated with high accuracy even if the user makes a mistake during the musical performance.

In an example (sixth aspect) of any of the first to fifth aspects, the played pitch indicated by the musical performance data is not corrected if the differences between the played pitch and the plurality of reference pitches corresponding to the playing position in the musical composition are more than the predetermined value. In the above-described aspect, a played pitch is not corrected if the differences between the played pitch and a plurality of reference pitches are more than the predetermined value, and thus played pitches played by the user can be preserved appropriately.

Preferable aspects of the present disclosure can also be realized with a musical performance correction device executing the musical performance correction method pertaining to each of the aspects described above as examples, or a program causing a computer to execute the musical performance correction method pertaining to each of the aspects described above as examples.

List of Reference Numerals

| | |
|---|---|
| 100 | Musical performance correction device |
| 11 | Control device |
| 12 | Storage device |
| 13 | Input device |
| 14 | Sound source device |
| 15 | Sound emission device |
| 16 | Musical performance device |
| 21 | Musical performance analysis unit |
| 22 | Pitch correction unit |

The invention claimed is:

1. A musical performance correction method executable by a computer, the musical performance correction method comprising:

acquiring from a MIDI instrument, musical performance data indicating a played pitch played by a user;

estimating a playing position in a musical composition by analyzing the musical performance data, wherein:

the playing position is estimated, for each of a plurality of combinations of a first pitch and a second pitch, using probability of the second pitch being erroneously played in place of the first pitch;

correcting the played pitch indicated by the musical performance data to a reference pitch, from among a plurality of reference pitches corresponding to the playing position in the musical composition, in a case where a difference between the played pitch and the reference pitch is less than a predetermined value;

generating a sound signal, corresponding to the musical performance data, including a reference pitch, in a state where the played pitch has been corrected to the reference pitch; and performing, via a DA converter, digital-to-analog conversion of the generated sound signal and outputting the converted sound signal to a sound emission device that emits the converted sound signal to sound.

2. The musical performance correction method according to claim 1, wherein the correcting of the played pitch corrects the played pitch to the reference pitch within a candidate period including the playing position in the musical composition in the case where the difference is less than the predetermined value.

3. The musical performance correction method according to claim 2, wherein the predetermined value is a variable value that corresponds to an instruction from the user.

4. The musical performance correction method according to claim 2, the correcting of the played pitch does not correct the played pitch indicated by the musical performance data in a case where differences between the played pitch and the plurality of reference pitches corresponding to the playing position in the musical composition are more than the predetermined value.

5. The musical performance correction method according to claim 1, wherein the correcting of the played pitch corrects the played pitch to the reference pitch, which is close to the playing position on a time axis in the musical composition, in the case where the difference is less than the predetermined value.

6. The musical performance correction method according to claim 5, wherein the predetermined value is a variable value that corresponds to an instruction from the user.

7. The musical performance correction method according to claim 1, wherein the predetermined value is a variable value that corresponds to an instruction from the user.

8. The musical performance correction method according to claim 1, the correcting of the played pitch does not correct the played pitch indicated by the musical performance data to the reference pitch in a case where differences between the played pitch and the plurality of reference pitches corresponding to the playing position in the musical composition are more than the predetermined value.

9. A musical performance correction device comprising:
- a memory storing instructions; and
- a processor that implements the instructions to:
  - acquire from a MIDI instrument, musical performance data indicated by a played pitch played by a user;
  - estimate a playing position in a musical composition by analyzing the musical performance data, wherein:
    - the playing position is estimated, for each of a plurality of combinations of a first pitch and a second pitch, using probability of the second pitch being erroneously played in place of the first pitch;
  - correct the played pitch indicated by the musical performance data to a reference pitch, from among a plurality of reference pitches corresponding to the playing position in the musical composition, in a case where a difference between the played pitch and the reference pitch is less than a predetermined value;
  - generate a sound signal, corresponding to the musical performance data, including a reference pitch, in a state where the played pitch has been corrected to the reference pitch; and
  - perform, via a DA converter, digital-to-analog conversion of the generated sound signal and output the converted sound signal to a sound emission device that emits the converted sound signal to sound.

10. The musical performance correction device according to claim 9, wherein the processor corrects the played pitch to the reference pitch within a candidate period including the playing position in the musical composition in the case where the difference is less than the predetermined value.

11. The musical performance correction device according to claim 10, wherein the predetermined value is a variable value that corresponds to an instruction from the user.

12. The musical performance correction device according to claim 9, wherein the processor corrects the played pitch to the reference pitch, which is close to the playing position on a time axis in the musical composition, in the case where the difference from the played pitch is less than the predetermined value.

13. The musical performance correction device according to claim 9, wherein the predetermined value is a variable value that corresponds to an instruction from the user.

14. The musical performance correction device according to claim 9, wherein the processor does not correct the played pitch indicated by the musical performance data in a case where differences between the played pitch and the plurality of reference pitches corresponding to the playing position in the musical composition are more than the predetermined value.

15. A non-transitory computer readable medium storing a musical performance correction program executable by a computer to execute a method comprising:
- acquiring from a MIDI instrument, musical performance data indicating a played pitch played by a user;
- estimating a playing position in a musical composition by analyzing the musical performance data, wherein:
  - the playing position is estimated, for each of a plurality of combinations of a first pitch and a second pitch, using probability of the second pitch being erroneously played in place of the first pitch;
- correcting the played pitch indicated by the musical performance data to a reference pitch, from among a plurality of reference pitches corresponding to the playing position in the musical composition, in a case where a difference between the played pitch and the reference pitch is less than a predetermined value;
- generating a sound signal, corresponding to the musical performance data, including a reference pitch, in a state where the played pitch has been corrected to the reference pitch; and
- performing, via a DA converter, digital-to-analog conversion of the generated sound signal and outputting the converted sound signal to a sound emission device that emits the converted sound signal to sound.

16. The non-transitory computer readable medium according to claim 15, wherein the correcting of the played pitch corrects the played pitch to the reference pitch within a candidate period including the playing position in the musical composition in the case where the difference is less than the predetermined value.

17. The non-transitory computer readable medium according to claim 15, the correcting of the played pitch does not correct the played pitch indicated by the musical performance data in a case where differences between the played pitch and the plurality of reference pitches corresponding to the playing position in the musical composition are more than the predetermined value.

* * * * *